United States Patent [19]

Thompson

[11] Patent Number: 4,904,942
[45] Date of Patent: Feb. 27, 1990

[54] ELECTROSEISMIC PROSPECTING BY DETECTION OF AN ELECTROMAGNETIC SIGNAL PRODUCED BY DIPOLAR MOVEMENT

[75] Inventor: Arthur H. Thompson, Houston, Tex.

[73] Assignee: Exxon Production Research Company, Houston, Tex.

[21] Appl. No.: 287,882

[22] Filed: Dec. 21, 1988

[51] Int. Cl.[4] .................. G01V 11/00; G01V 3/12; G01V 3/30; G01V 1/00
[52] U.S. Cl. .................. 324/323; 324/334; 324/344; 324/347; 367/14
[58] Field of Search ................ 324/323, 334, 344–350; 367/14

[56] References Cited

U.S. PATENT DOCUMENTS

| | | | |
|---|---|---|---|
| 2,054,067 | 9/1936 | Blau et al. | 324/323 X |
| 2,354,659 | 8/1944 | Bazhaw et al. | 324/323 X |
| 3,392,327 | 7/1968 | Zimmerman et al. | 324/323 X |
| 3,524,129 | 8/1970 | Ikrath et al. | 324/323 |
| 3,621,380 | 11/1971 | Barlow, Jr. | 324/323 X |
| 3,975,674 | 8/1976 | McEuen | 324/323 X |
| 4,104,611 | 8/1978 | Kalden | 324/323 X |
| 4,349,781 | 9/1982 | Vozoff | 324/346 |
| 4,366,494 | 12/1982 | Ohta | 357/5 |
| 4,591,787 | 5/1986 | Hoenig | 324/248 |
| 4,639,675 | 1/1987 | Hinton | 324/334 |
| 4,692,905 | 9/1987 | Sobolev et al. | 367/14 |
| 4,774,469 | 9/1988 | Sobolev et al. | 324/344 X |

OTHER PUBLICATIONS

Biot, M. A., 1956, Theory of Propagation of Elastic Waves in a Fluid-Saturated Porous Solid, J. Acoust. Soc. Am. 28, 168.
Martner, S. T. and Sparks, N. R., Apr. 1959, The Electroseismic Effect, Geophysics, vol. XXIV, No. 2, pp. 297–308.
Biot, M. A., 1962, Generalized Theory of Acoustic Propagation Porous Dissipative Media, J. Acoust. Soc. Am., 34, 1254.
Neishatadt, Naum Mikhailovich, 1970, the Utilization of Seismoelectric and Prizoelectric Phenomena in Exploration Geophysics, Nedia Press, Leningrad, USSR.
Bockris, J. O. and Reddy, A. K. N., 1976, *Modern Electrochemistry*, vol. 2, pp. 824–825 Plenum Press, New York.
Simonvan, S. S., Mar. 1987, The Dependence of the Seismoelectic Affect on the Uniaxial Pressure Under Saturation of the Specimens by Solutions of Common Salt, Akad. Nauk Arin. SSR, Inst. Geofiz pp. 56–59p.

*Primary Examiner*—Gerard R. Strecker
*Attorney, Agent, or Firm*—Frank S. Vaden, III

[57] ABSTRACT

A method of electroseismic prospecting is disclosed for detecting either the presence of two immiscible fluids present in a porous subterranean formation or the presence of a high-permeability rock formation including a substantially aqueous phase therein. A seismic impact produces an acoustical wavefront that results in an enhanced electromagnetic signal when it encounters either types of the above-described formations. This resulting enhanced electromagnetic signal is detectable as an indication of a likely hydrocarbon deposit, thereby giving additional data information with conventional seismic data to the geophysical prospector.

32 Claims, 3 Drawing Sheets

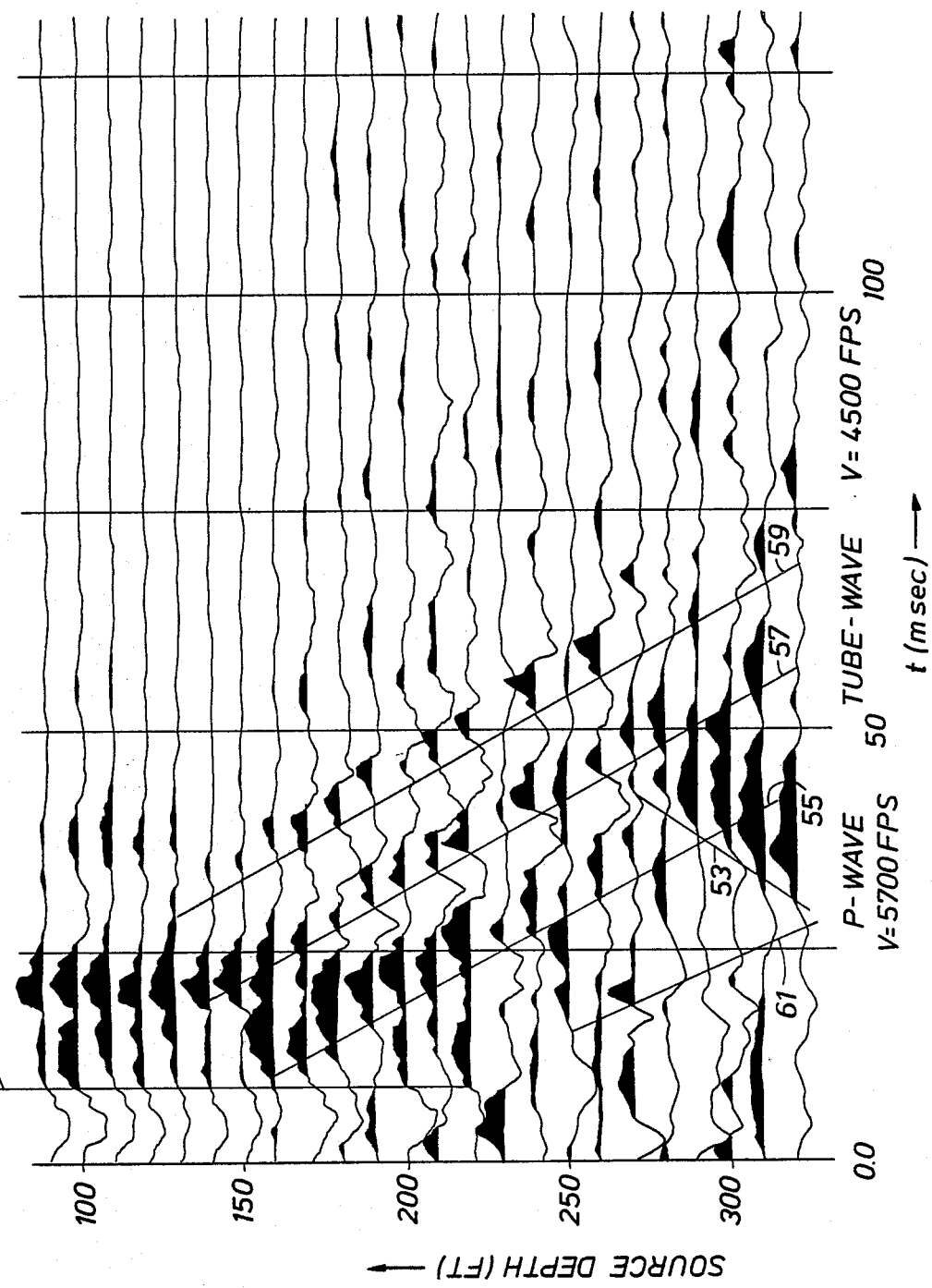

ELECTROSEISMIC PROSPECTING BY DETECTION OF AN ELECTROMAGNETIC SIGNAL PRODUCED BY DIPOLAR MOVEMENT

BACKGROUND OF THE INVENTION

1. Field of the Invention

This invention pertains to the acquisition of electroseismic data and more specifically to the acquisition of such data by the development and detection of electromagnetic waves.

2. Description of the Prior Art

Most seismic prospecting is accomplished by the development of acoustical waves from one or more seismic sources located at or near the earth's surface. These acoustic waves are known to be reflected by interfaces or discontinuities in the subterranean formations so as to be returned to the earth's surface to be detected by one or more appropriately positioned seismic or acoustical detectors, normally geophones. It is known that some of the reflected waves are so-called shear waves (s-waves) and other of the reflected waves are so-called compressional waves (p-waves), differing from each other in their respective angles of reflection and the acoustical vibrational directions of the particles in the layered formations through which the waves pass. Significantly, both wave types travel basically at the speed of sound and are attenuated by the formations through which they pass in the same manner as any other sound waves in the same frequency range, which are in the low frequency range for relatively deep prospecting since it is well known that the higher frequencies are greatly attenuated by the formation media.

Attempts have been made over the years to employ a scheme for seismic prospecting that used other phenomena than acoustical detection with geophones as just described. For example, as early as 1936, a procedure was patented by L.W. Blau, et al, U.S. Pat. No. 2,054,067, that utilized resistance modulation near the earth's surface resulting from a seismic blast to cause a detectable electromagnetic response. Basically, the formations near the surface are stratified into layers having different densities. A seismic blast would cause each layer of its particular constituent structure to modulate in accordance with its density i.e., its porosity makeup. Thus, the detected electromagnetic field at a particular location, being proportional to the resistance modulation within the field, is an indication of how thick the respective layers of different densities are at that particular location. The technique described in the '067 patent was not greatly commercialized, if at all, probably because it was useful only at shallow depths in the vicinity of the surface and not useful to any significant depth where the majority of interest is in oil and gas prospecting. This early work by Blau et al was directed at the measurement of the seismically induced resistance modulation of the formation by passing an electrical current through (or applying a voltage to) the earth and then measuring the modulation of that current (or the modulation of the resulting voltage). As will be evident, this method is distinctively different from the procedure described herein basically because no current is applied to the formation or earth surface.

Another technique that has been employed with respect to the detection of certain mineral deposits utilizes a continuous wave seismic source that induces a voltage in the deposit due to the piezoelectric effect. In such a case, the seismic wave distorts a piezoelectric formation like quartz, which then is polarized and emits an electromagnetic wave. No fluids are involved. Such techniques utilize relatively high frequencies and, therefore, are limited to a short penetration depth and, further, is useful in detecting only those limited kinds of deposits that exhibit a piezoelectric effect characteristic.

One of the most interesting attempts to develop an alternate technique to the standard seismic acoustic technique is described in U.S. Pat. No. 2,354,659, W.0. Bazhaw, et al, issued Aug. 1, 1944. In accordance with this procedure, a seismic blast downward would encounter a layer of fluid in the subterranean formation located underneath a gas layer and cause the fluid to rapidly rise upward into the presumably porous gas layer. As the relatively slow settling of the fluid (oil and water) occurs, this slow downward fluid movement induces a current change in the path between two electrodes embedded in the earth's surface and connected to a suitable electronic amplifier and recorder. If no liquid is present, then there is no current change. If there is a liquid present, then there is a change depending on the respective parameters of the fluid and formation. Such change can be metered as a dc voltage for an appreciable period of time after the blast until equilibrium is reached. Although different from the Blau et al procedure, the technique involves a procedure useful at only very shallow depths and therefore has little, if any, practical commercial application. This is because (1) the dc voltage will not propagate as an electromagnetic wave and, therefore, is only useful at shallow depths and (2) very low frequencies, essentially dc, have very long wave lengths, which means there is very poor depth resolution. It will be seen that by contrast, the procedure described herein retains the frequency character of a seismic wave.

The basic physical process required for electroseismic prospecting or ESP in accordance with applicant's invention is that seismic energy can be converted to electromagnetic energy of significant value. Although there are several possible theoretical conversion mechanisms that might cause the observed happening, such as resistance modulation, discussed above, spontaneous potentials and electrocapillarity, the mechanism that best explains the observations of applicant and is useful in utilizing the procedure herein described, is referred to as "streaming potential". This mode of conversion of seismic to electromagnetic energy appears to be the theory that is most effective in analyzing what occurs with fluid movement present in a porous lithological formation and is most pronounced when there is the presence of at least two immiscible fluids, such as oil and water or gas and water. The phenomenon also exists in the presence of a lithological structure of high permeability where there is pore fluid in the structure. Basically in accordance with this theory, there is a molecular chemical-bond attraction between the fluid and the porous surface of the solid formation, which bond is distorted or broken with the rapid movement of the fluid upon contact by an acoustical wavefront, thereby inducing in a dipole manner an electromagnetic response. M.A. Biot described the fluid movement accompanying a seismic pressure gradient in papers published by the Journal of the Acoustical Society of America in 1956 and 1962, at page 168 of volume 28 and page 1254 of volume 34, respectively. Others, such as J.0. Bockris and A.K.N. Reddy have experimented with the streaming potential and reported circa 1973 on their findings, but heretofore, the effect has not been utilized in electroseismic prospecting such as set forth herein.

Therefore, it is a feature of the present invention to utilize the "streaming potential" effect in electroseismic prospecting for inducing a detectable electromagnetic field capable of directly revealing the presence of two immiscible fluids, such as an oil and water or gas and water or the presence of a fluid in the pore space of a high-permeability formation.

As noted, this invention pertains to the acquisition of electroseismic data and is referred to sometimes herein as electroseismic prospecting or ESP. Electroseismic prospecting is distinguishable from the operation of an electromagnetic geophone, which senses the presence of a reflected seismic or acoustical wave at the earth's surface. Although electromagnetic geophones were first investigated prior to 1950, their operation did not lead to electroseismic prospecting.

There is an essential distinction that can be made between ESP data and seismic data. Seismic data only reveal structural information related to the elastic contrast between two different lithological regions. No information is revealed about what kind of rock is present or what is in the pore space of the regions under investigation. On the other hand, ESP only works where there is mobile, conducting water in the pore space of the formation under investigation or where there is a mixture of water and hydrocarbon. Therefore, it is clear that ESP is not a special case of seismology, but is fundamentally different. The fact that ESP is sensitive to the type of pore fluid is the source of its usefulness.

Therefore, it is yet another feature of the present invention to detect in an improved manner the presence of mobile, conducting water in the pore space of a lithological formation under investigation or the presence of a mixture of water and hydrocarbon.

SUMMARY OF THE INVENTION

The technique described herein is for the electroseismic detection of the presence of two immiscible fluids present in a porous subterranean formation or the presence of fluid in the pore space of a high permeability formation. The procedure involves initiating a seismic impact, such as by dynamite explosion, thumping or the like in conventional fashion by one or more sources located at or near the earth's surface. Alternatively, the seismic source can be located in either a relatively shallow or even a deep (i.e. formation penetrating) well bore. The seismic or acoustical wavefront produced thereby progresses through the subterranean formation until it encounters the presence of one of the detectable formations described above. At such a formation, the fluid or fluids within the rock pore space will move significantly, thereby causing or inducing an electromagnetic response by the "streaming potential" effect. In the two-fluid case, fluids of significant volume will be rapidly displaced with respect to the porous rock formation, thereby creating an instantaneous predominantly vertical dipole in the conducting fluid component next to the solid surface. In the single conducting fluid case, fluid of significant volume will be rapidly displaced with respect to the porous rock formation, also creating an instantaneous, predominantly vertical dipole where the conducting fluid is attracted to the solid. The electromagnetic radiation that emanates from this dipole is effectively a wave that transmits through the subterranean formation back to the earth's surface at the speed of light through the lithological material between the point of reflection and the point of detection.

At the surface, a suitable detector responds to the electromagnetic field. Suitable detectors are principally electronic detectors although magnetic sensors could also be used. It has been discovered that the most simple and most sensitive sensor is in the form of two rod-like electrodes spaced apart at a distance of about 15-2000 feet or 4.6-610 meters, the rods being driven into the earth's surface to an adequate depth to be embedded into the first water table beneath the surface. The actual separation depends on (1) electrical noise generated at the electrode contact with the ground, (2) environmental noise, (3) signal strength, and (4) depth of the formation of interest. The field induces a measurable potential difference or voltage, which is detectable and amplified and eventually recorded in standard fashion.

BRIEF DESCRIPTION OF THE DRAWINGS

So that the manner in which the above-recited features, advantages and objects of the invention, as well as others which will become apparent, are attained and can be understood in detail, more particularly description of the invention briefly summarized above may be had by reference to the embodiments thereof that are illustrated in the drawings, which drawings form a part of the specification. It is to be noted, however, that the appended drawings illustrate only preferred embodiments of the invention and are, therefore, not to be considered limiting of its scope for the invention may admit to other equally effective embodiments.

In the drawings

FIG. 5 is a visual representation of field recorded electromagnetic data resulting from a physical arrangement of components as shown in FIG. 4.

DESCRIPTION OF THE PREFERRED EMBODIMENTS

Figure 1:
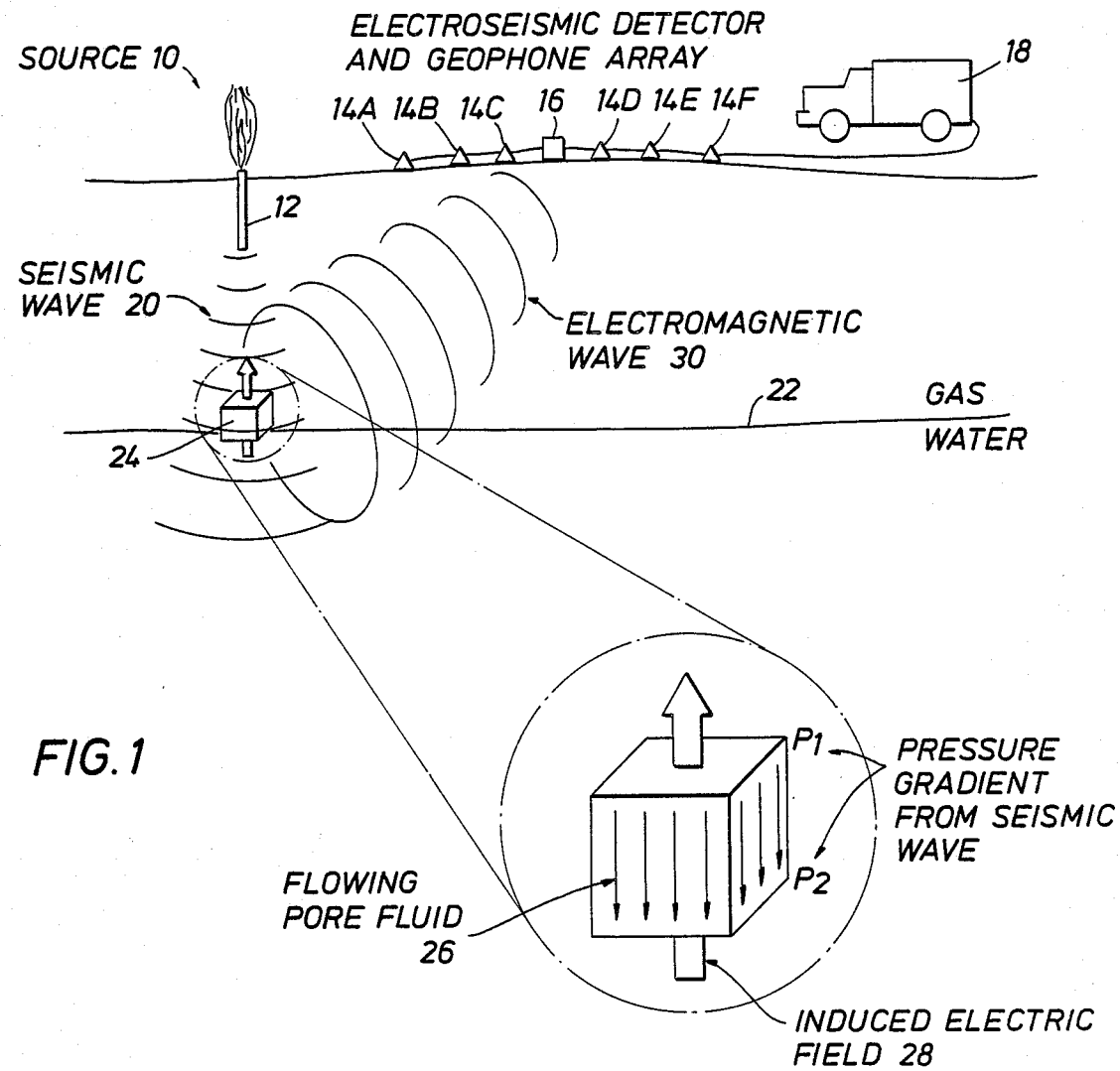
FIG. 1 is a cross sectional view of a typical procedural arrangement of components illustrating a preferred embodiment of the invention.

Now referring to the drawings and first to FIG. 1, a typical preferred embodiment of the present invention is illustrated. A source 10 is located at or near the earth's surface, which can also be within a shallow well bore 12. Spaced apart from the source are detectors suitable for detecting seismic reflections. These include a geophone array comprised of geophones 14A-F for detecting the normal acoustic reflections well-known in the prior art and a suitable electroseismic detector 16, more completely described herein. Both the geophone detector array and the electroseismic detector can be connected to a recorded located in a recorded van 18.

Source 10 can be a single dynamite source, an acoustical "thumper" or a more complex source, as desired. Generally, however, when it is activated, seismic or acoustical energy emanates therefrom as seismic wave 20 through the subterranean lithology beneath the source location. For purposes of discussion, there exists in FIG. 1 an area of the formation where a gas layer is in contact with a water layer. The interface between these two layers is identified in the drawing with reference numeral 22. The formation where these two immiscible fluids exist is the formation that is detectable in accordance with the procedure of the present invention. A segment 24 of this detectable formation is shown in an exploded view. For convenience, this segment of the formation is illustrated as a three-dimensional cube.

Figure 2:
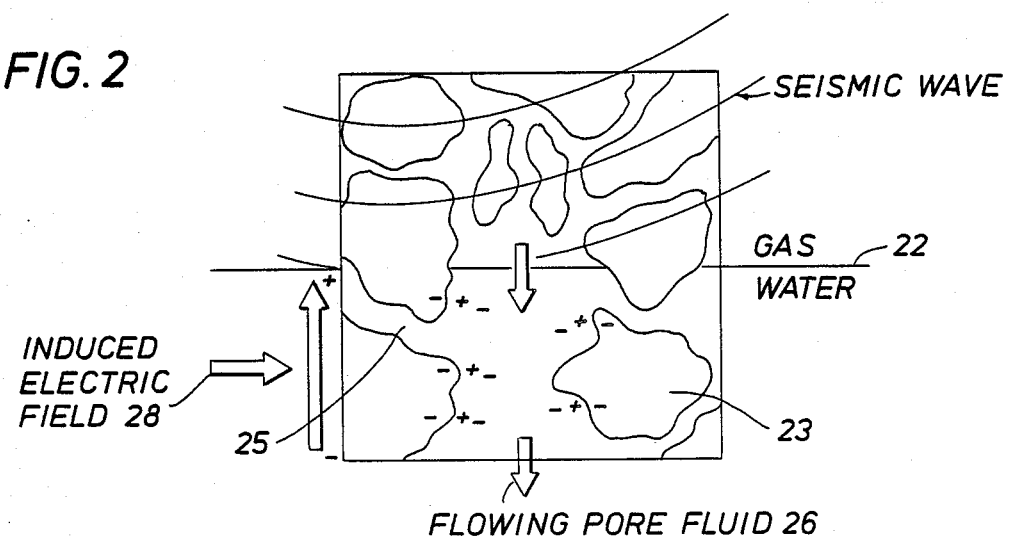
FIG. 2 is a partial cross-sectional view of a porous formation suitable for electromagnetic excitation by a seismic wavefront in accordance with the present invention, also illustrating the "streaming potential " effect.

The formation itself is porous, as is more clearly illustrated in FIG. 2. That is, there are solid rock portions 23 interspersed throughout with channel-like pore spaces 25. Because gas and water do not mix, the water settles and fills spaces 25 below interface line 22 and gas fills spaces 25 above that line. Where water exists, there is an electrochemical bond between the water, the heavier of the gas and water fluids, and the solid rock portions 23. This is shown by the "+" symbols in the fluid portion and the "−" symbols in the solid portion of the formation.

The sign of the electric field or field polarity direction depends on the surface charge on the solid and the way the fluid screens out that charge. In clays, the charge is typically as shown in FIG. 2. However, in carbonates, the charge could well be reversed, i.e., with the "+" charge on the solid.

When an acoustical seismic wave 20 impacts the formation in the illustrated region of the formation, there is a pressure gradient established at depth $P_1$ and depth $P_2$ that pushes down on the water, starting at the water surface, and which passes downward through the fluid in a substantially vertical direction, causing the fluid to move downward. This is illustrated by flowing pore fluid arrows, 26 shown in FIG. 1. It will be seen that this downward movement has the effect of separating the electrochemical bonds, thereby effectively establishing a substantially vertical dipole where the bonds are distorted or broken. This dipole is not just in the area near the water surface or interface 22, but throughout the depth of the formation where the lithology illustrated exists. Thus, a vertical electric field 28 is induced in an upward vertical direction at the point of impact having a force or strength of significant value. The polarity of this field is negative-to-positive in a progressively upward direction, in the example of FIG. 1.

As described above, usually the first arrival of the seismic wave will displace the fluid downward. However, as is described hereinafter with respect to the example of FIG. 4, the first arrival could correspond to upward movement. Also, after the first arrival, the fluid relaxes and moves in the opposite direction. However, generally the fluid moves in the direction of the pressure gradient, which is contrary to the teaching of Bazhaw in U.S. Pat. No. 2,354,659.

It is apparent that electric field 28 is generated when the pores above line 22 are either filled with a gas or when these pores are free of either a gas or a liquid. When there are two liquids, such as oil and water, the rate of downward movement of the two fluids is similar, but only the conducting liquid movement generates an electric field so that at the line where the two fluids meet, a discontinuity in the electric field will occur.

Electric field 28 produces a corresponding electromagnetic wave 30 that emanates away from the impacted region just described. An electromagnetic wave, unlike a reflecting acoustic wave, travels, at the speed of light with respect to the existing lithological formation. Of course, if there is a conventional seismic reflecting boundary, acoustical reflections will occur and will be detected by the geophone array, also in conventional fashion. The detection of the electromagnetic wave, however, will occur whenever there is fluid in a porous formation of high permeability substance or when there are two immiscible fluids in a formation.

When there are two fluids present, both fluids move at approximately the same speed. The importance of two fluids is somewhat subtle and the recognition of what effects this has not been perceived heretofore so that the scientific advancement herein described is only now possible. When there is a boundary between two fluids (e.g., a gas-water contact), the boundary is a plane at which seismic energy is reflected, and part of that energy is converted to fluid motion. The ESP signal is large because of this seismic-energy conversion.

When there are two fluids in the same pore structure (i.e., droplets of oil in water or bubbles of gas in water), any fluid motion leads to a large electrical field because the distortion of the droplet or bubble shape contributes to the electrical field. This is the "electrocapillary" effect previously mentioned. Like the streaming potential, the electrocapillary effect has been known in electrochemistry for many years, but its importance for ESP has not been recognized.

Figure 3:
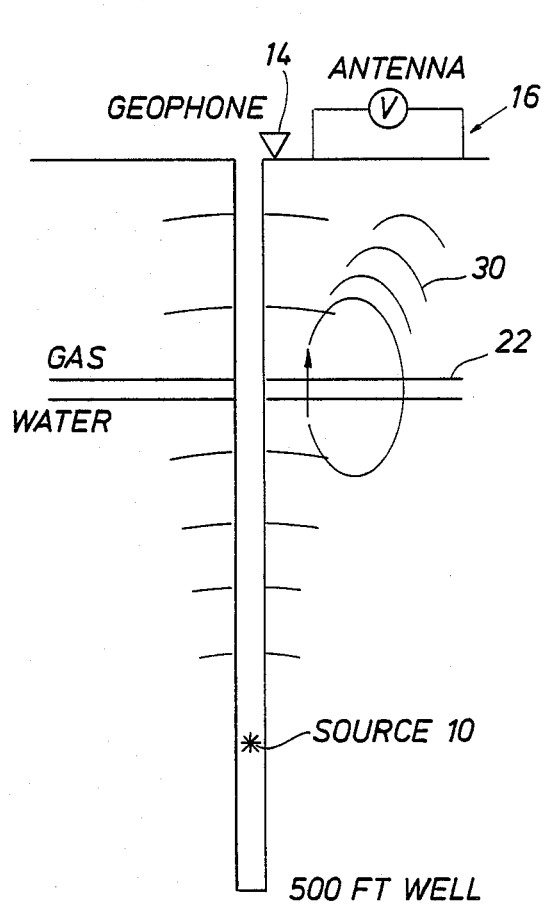
FIG. 3 is a schematic representation of another preferred arrangement of the present invention wherein the source is located near the bottom of a relatively shallow well bore.

Now referring to FIG. 3, an alternate placement of a source 10 is shown, which is illustrated in a well bore and at a distance near the bottom of a 500 foot (152.4 meter) well. This location is below gas/water line 22. A geophone 14 located near the opening of the well bore at the earth's surface will detect the acoustic wave form caused by activation of the source. The acoustic wave moving up the well bore is referred to as a "tube" wave. The acoustic wave impacting on the region defined by line 22 will produce an electromagnetic response as previously described and is detectable by a suitable detector 16.

Figure 4:
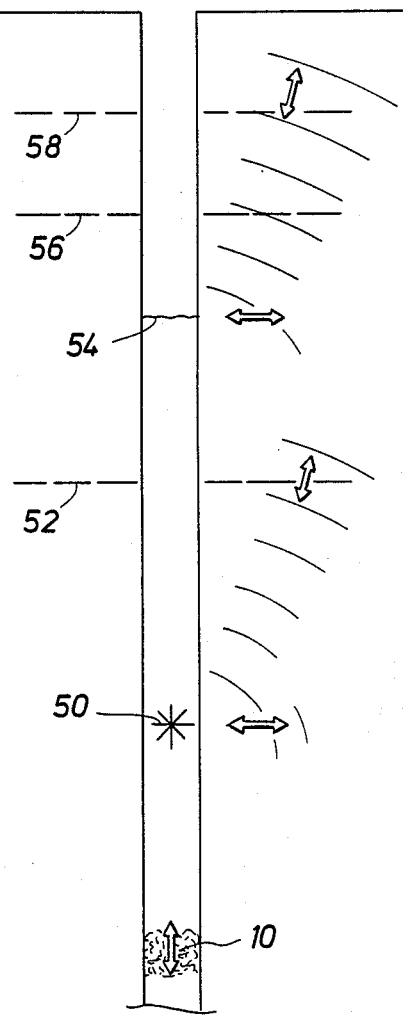
FIG. 4 is a schematic representation of the tube wavefront moving up a well bore from a sourcing event and the electromagnetic responses that occur therefrom.

As more completely shown in FIG. 4, several conditions can exist in the well bore and in the lithology near the well bore that result in an electromagnetic response and are detectable in the manner shown in FIG. 3. An electrical response graphical representation resulting from the effects of the physical arrangement of FIG. 4 is shown in FIG. 5. At position 50, it is assumed that there is aqueous saline liquid in a high-permeability formation. The impact of the acoustic pressure from the seismic source 10 will result in an outwardly directed fluid movement at that point, which translates into a detectable electromagnetic response.

At line 52, there is a gas strata, that is likewise excited by the impact of the acoustical p-wave. Again, there is an electromagnetic wave response thereto, which is detectable at the surface.

At point 54, the surface of the fluid in the well bore is reached by the tube wave and again produces an outward response into the formation that results in electromagnetic responses at lines 56 and 58, similar to line 22, where two immiscible fluids meet. By monitoring both the acoustic waves and the electromagnetic waves, it is possible to determine what has occurred at each level. It should be remembered that the acoustic waves travel at the speed of sound and the electromagnetic waves travel at the speed of light, making it readily apparent when there has been an electromagnetic response to an acoustical wavefront. Thus, the electromagnetic detection of the source at the mouth of the well bore is shown by vertical line 51 in FIG. 5, the line being vertical since the electro-magnetic wave moves up the well bore at the speed of light. Line 53 in FIG. 5 is the electromagnetic response to the ESP signal generated when an acoustic tube wave travels downward in the well, impacts the well bottom, and causes a downward flow of fluid in the formation.

The electromagnetic responses to fluid surface 54 is shown by line 55; to formation 56 by line 57; to formation 58 by line 59; and to gas strata line 52 by line 61 on FIG. 5. In the example experiment that created the response shown in FIG. 5, the seismic source in the well was a plastic explosive of 19 grams weight. The typical signal response of FIG. 5 caused a voltage of several tens of microvolts to occur across the antenna, which was 15 feet (4.6 meters) long.

The lines drawn on FIG. 5 are helpful in interpretation since their slopes are a measure of the seismic velocity. As indicated in the figure, lines 53, 55, 57 and 59 are associated with tube waves in the well bore. It is well-known that tube waves in a formation as shown in the example have a velocity of 4500 feet per second (1372 meters per second). In contrast, line 61 corresponds to seismic propagation in the formation surrounding the well bore, where it is well-known that the characteristic compressional wave velocity is 5700 feet per second (1738 meters per second). Line 61 has a slope of 5700 feet per second (1738 meters per second).

Figure 6:
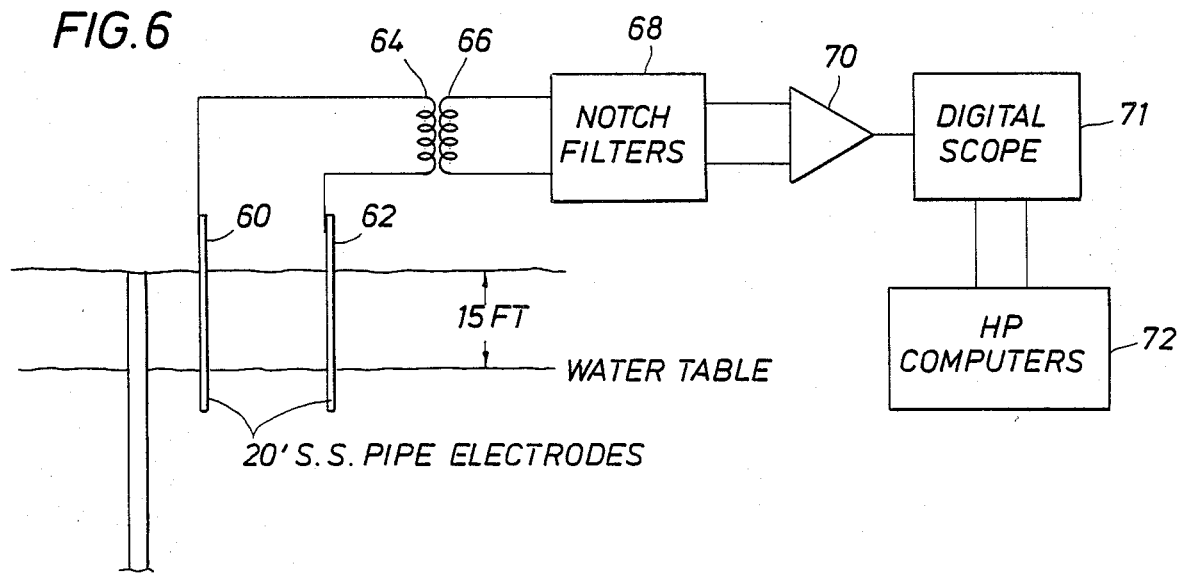
FIG. 6 is a simplified electrical diagram of a suitable electromagnetic detector in accordance with a preferred embodiment of the present invention.

FIG. 6 illustrates a simple arrangement for electromagnetic detection. It will be noted that a detector can easily be made by spaced apart stainless steel pipe electrodes 60 and 62, preferably driven to a depth to reach the water table. Other metal pipes such as copper or lead can also be used. In the drawing, it is assumed that the water table is at 15 feet (4.6 meters), so electrodes that are 20 feet (6.1 meters) long are adequate. Detection is possible, however, with electrodes that are not driven into the water table. The two electrodes are located typically between 15–2000 feet (4.6–610 meters) apart. The two electrodes are connected, optionally in series with a battery through a primary coil 64 of a transformer. A secondary coil 66 coupled thereto is connected through suitable notch filters for removing stray pickup frequencies to amplifier 70. For example, if there is a power line nearby, notch filters 68 at 60 Hertz is desirable. The amplifier can be connected to a display 71, a recording computer 72 or the like, as desired. This equipment is normally located in a nearby van or other suitable shelter.

While a preferred embodiment of the invention has been shown and described, and some modifications or alternatives have been discussed, it will be understood that the invention is not limited thereto since modifications can be made and will become apparent to those skilled in the art. For example, only one type of electromagnetic detector is shown. Any suitable electrical or magnetic detector capable of detecting the electromagnetic waves that are created as discussed herein can be employed. Also, a source can be located at a deep level where it is within the region where electromagnetic excitation occurs as herein described.

What is claimed is:

1. The method of electroseismic prospecting for the existence of hydrocarbon deposits by the detection of two immiscible fluids present in a porous subterranean formation, which comprises
    initiating a seismic impact at a source location such that if the acoustical wavefront therefrom encounters a region of porous subterranean formation containing at least two immiscible fluids in a common pore space an electromagnetic signal originating from dipolar movement in said region and traveling from said region at the speed of light is produced and
    detecting said electromagnetic signal as an indication of the existence of likely hydrocarbon deposits in the vicinity of said region.

2. The method of electroseismic prospecting in accordance with claim 1, wherein the two immiscible fluids are largely separated, such that the shallower portion of said pore space is predominantly filled with gas fluid and the deeper portion of said pore space is predominantly filled with aqueous fluid, wherein the origin of said electromagnetic signal is in the region of contact between said shallower fluid-filled portion and said deeper fluid-filled portion of said pore space.

3. The method of electroseismic prospecting in accordance with claim 1, wherein the two immiscible fluids are largely separated, such that the shallower portion of said pore space is predominantly filled with liquid hydrocarbon fluid and the deeper portion of said pore space is predominantly filled with aqueous fluid, wherein the origin of said electromagnetic signal is in the region of contact between said shallower fluid-filled portion and said deeper fluid-filled portion of said pore space.

4. The method of electroseismic prospecting in accordance with claim 1, wherein a third fluid is present with the two immiscible fluids, said third fluid being miscible with one of the two immiscible fluids.

5. The method of electroseismic prospecting in accordance with claim 1, wherein the seismic impact is initiated at or near the earth's surface.

6. The method of electroseismic prospecting in accordance with claim 1, wherein the seismic impact is initiated at a down-hole location from inside a well penetrating substantially beneath the earth's surface.

7. The method of electroseismic prospecting in accordance with claim 6, wherein the seismic impact is initiated at a location from inside a well penetrating said region of porous subterranean formation.

8. The method of electroseismic prospecting in accordance with claim 1, wherein said immiscible fluids include a gas and a liquid.

9. The method of electroseismic prospecting in accordance with claim 1, wherein said immiscible fluids include an aqueous component and a substantially hydrocarbon component.

10. The method of electroseismic prospecting in accordance with claim 1, wherein the frequency of the seismic impact is in a range approximately between 1–500 Hertz and the frequency of the electromagnetic signal is in a range approximately comparably between 1–500 Hertz.

11. The method of electroseismic prospecting in accordance with claim 1, wherein the frequency of the seismic impact is in a range approximately between 1–100 Hertz and the frequency of the electromagnetic signal is in a range approximately comparably between 1–100 Hertz.

12. The method of electroseismic prospecting in accordance with claim 1, wherein the electromagnetic signal is magnetically detected.

13. The method of electroseismic prospecting in accordance with claim 1, wherein the electromagnetic signal is electrically detected.

14. The method of electroseismic prospecting in accordance with claim 13, wherein the electromagnetic signal is electrically detected using two electrodes imbedded in the earth's surface and the voltage therebetween is detected as the electromagnetic signal wavefront encounters the respective electrodes.

15. The method of electroseismic prospecting in accordance with claim 14, wherein the electrodes are embedded to a depth that penetrates into the first water table existing beneath the earth's surface.

16. The method of electroseismic prospecting in accordance with claim 13, wherein the electromagnetic signal is electrically detected using two electrodes spaced apart at different depths in a well bore, each of said electrodes penetrating the earth's lithological formation adjacent said well bore.

17. The method of electroseismic prospecting for the existence of hydrocarbon deposits by the detection of a body of high-permeability rock located beneath the earth's surface that includes a substantially aqueous phase in the pore space of said rock, which comprises
initiating a seismic impact at a source location such that if the acoustical wavefront therefrom encounters a body of high-permeability rock that contains a pore fluid having a substantially aqueous phase in the pore space of said rock an electromagnetic signal originating from dipolar movement in said body and traveling from said body at the speed of light is produced, and
detecting said electromagnetic signal as an indication of the existence of likely hydrocarbon deposits in the vicinity of said high-permeability rock.

18. The method of electroseismic prospecting in accordance with claim 17, wherein the seismic impact is initiated at or near the earth's surface.

19. The method of electroseismic prospecting in accordance with claim 17, wherein the seismic impact is initiated at a down-hole location from inside a well penetrating substantially beneath the earth's surface.

20. The method of electroseismic prospecting in accordance with claim 19, wherein the seismic impact is initiated at a location from inside a well penetrating said region of porous subterranean formation.

21. The method of electroseismic prospecting in accordance with claim 17, wherein said pore fluid is substantially saline water.

22. The method of electroseismic prospecting in accordance with claim 17, wherein said pore fluid is substantially saline water with a minor dissolved component of gas.

23. The method of electroseismic prospecting in accordance with claim 17, wherein said pore fluid is substantially saline water with a minor dissolved component of hydrocarbon liquid.

24. The method of electroseismic prospecting in accordance with claim 17, wherein the frequency of the seismic impact is in a range approximately between 1–500 Hertz and the frequency of the electromagnetic signal is in a range approximately comparably between 1–500 Hertz.

25. The method of electroseismic prospecting in accordance with claim 17, wherein the frequency of the seismic impact is in a range approximately between 1–100 Hertz and the frequency of the electromagnetic signal is in a range approximately comparably between 1–100 Hertz.

26. The method of electroseismic prospecting in accordance with claim 17, wherein the electromagnetic signal is magnetically detected.

27. The method of electroseismic prospecting in accordance with claim 17, wherein the electromagnetic signal is electrically detected.

28. The method of electroseismic prospecting in accordance with claim 27, wherein the electromagnetic signal is electrically detected using two electrodes imbedded in the earth's surface and the voltage therebetween is detected as the electromagnetic signal wavefront encounters the respective electrodes.

29. The method of electroseismic prospecting in accordance with claim 28, wherein the electrodes are embedded to a depth that penetrates into the first water table existing beneath the earth's surface.

30. The method of electroseismic prospecting in accordance with claim 27, wherein the electromagnetic signal is electrically detected using two electrodes spaced apart at different depths in a well bore, each of said electrodes penetrating the earth's lithological formation adjacent said well bore.

31. The method of electroseismic prospecting in accordance with claim 17, wherein said high-permeability rock has a hydraulic permeability greater than 0.1 millidarcy.

32. The method of electroseismic prospecting in accordance with claim 17, wherein said high permeability rock has a hydraulic permeability greater than 100 millidarcy.

* * * * *